United States Patent [19]
Mentink

[11] Patent Number: 6,149,221
[45] Date of Patent: Nov. 21, 2000

[54] HYDRAULIC CONTROL UNIT, IN PARTICULAR FOR OPERATING A FOLDING ROOF OF A VEHICLE

[75] Inventor: Laurentius A. G. Mentink, Haaksbergen, Netherlands

[73] Assignee: Applied Power Inc., Butler, Wis.

[21] Appl. No.: 09/258,964

[22] Filed: Mar. 1, 1999

[30] Foreign Application Priority Data

Mar. 3, 1998 [NL] Netherlands ............................ 1008455

[51] Int. Cl.$^7$ ................................ F16D 31/02; B60J 7/12
[52] U.S. Cl. ........................ 296/117; 296/107.08; 60/429; 60/476
[58] Field of Search ............................ 60/428, 429, 476; 296/107.08, 117

[56] References Cited

U.S. PATENT DOCUMENTS

| | | | |
|---|---|---|---|
| 2,657,533 | 11/1953 | Schanzlin et al. | 60/52 |
| 5,666,873 | 9/1997 | Lindmayer et al. | 91/511 |
| 5,724,878 | 3/1998 | Stolle et al. | 91/165 |
| 5,737,992 | 4/1998 | Torrekens et al. | 91/59 |
| 5,760,695 | 6/1998 | Huber | 340/614 |
| 6,039,382 | 3/2000 | Mather et al. | 296/107.01 |

FOREIGN PATENT DOCUMENTS

| | | |
|---|---|---|
| 0 656 274 A1 | 6/1995 | European Pat. Off. . |
| 42 36 517 A1 | 11/1993 | Germany . |
| 2 266 930 | 11/1993 | United Kingdom . |

*Primary Examiner*—D. Glenn Dayoan
*Assistant Examiner*—Paul Chenevert
*Attorney, Agent, or Firm*—Quarles & Brady LLP

[57] ABSTRACT

Hydraulic control unit, in particular for the folding roof of a vehicle, comprising a reservoir for hydraulic fluid, a pump for drawing hydraulic fluid out of the reservoir and provided with a delivery port for delivering compressed hydraulic fluid, and also at least one first hydraulic actuator of the double-acting type with a first and a second variable working chamber, which working chambers are separated by a piston and are provided with a first and a second connection respectively for supplying hydraulic fluid to said working chambers, further comprising a control valve assembly with a first exit port and a second exit port, which are connected respectively to the first and the second connection of the first actuator, for controlling the movements of the first actuator. The control valve assembly comprises one or more operable control valves and is designed for selectively connecting one of the two or both exit ports thereof to the delivery port of the pump or the reservoir. In addition, an AND valve is provided, having a first and a second entry port and an exit port. The entry ports of the AND valve are connected here respectively to the first and the second exit port of the control valve assembly. The exit port of the AND valve forms a third exit port for controlling one or more following actuators of the hydraulic control unit.

10 Claims, 5 Drawing Sheets

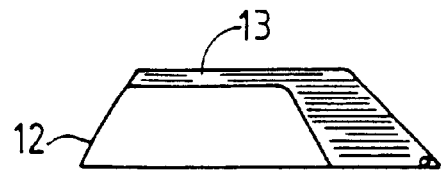
FIG. 3A
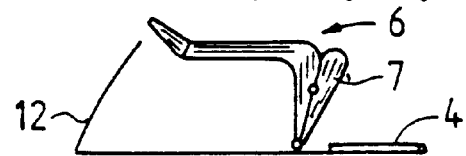
FIG. 3B
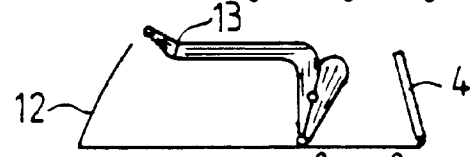
FIG. 3C
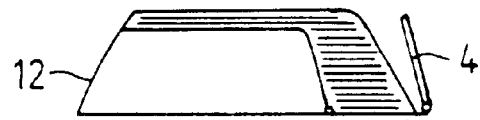
FIG. 3D
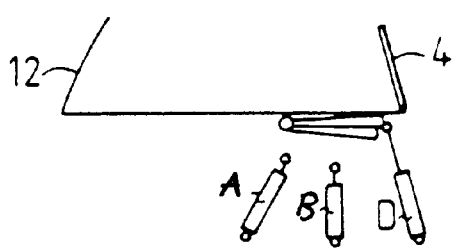
FIG. 3E
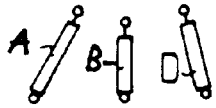
FIG. 3F

FIG. 4A
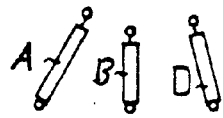
FIG. 4B
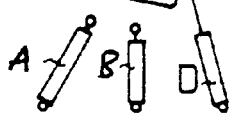
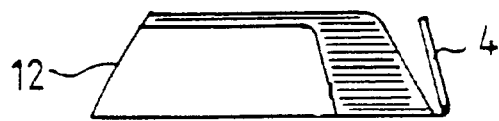
FIG. 4C
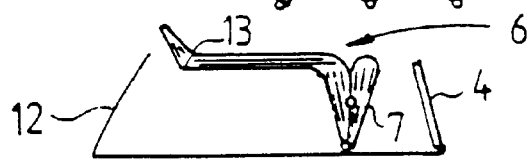
FIG. 4D
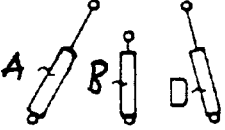
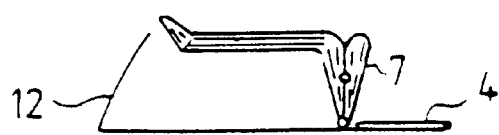
FIG. 4E
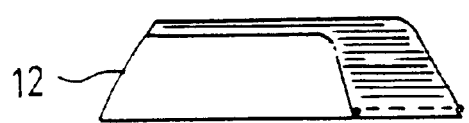
FIG. 4F

HYDRAULIC CONTROL UNIT, IN PARTICULAR FOR OPERATING A FOLDING ROOF OF A VEHICLE

BACKGROUND OF THE INVENTION

1. Field of the Invention

The present invention relates to a hydraulic control unit, in particular for a folding roof of a vehicle. The invention also relates to a folding roof assembly comprising such a hydraulic control unit, and to a vehicle of the convertible type which is provided with such a folding roof assembly.

2. Description of the Prior Art

A generally known hydraulically operating control unit for a folding roof of a convertible car comprises for each pair of hydraulic double-acting cylinders connected in parallel two electrically operated 3/2 control valves for controlling the movements of said cylinders. This makes it possible to drive the movements of the parts of the folding roof in a simple manner, but has the disadvantage that many relatively expensive electrically operated control valves are necessary, with the result that the cost of this known control unit is undesirably high.

Folding roof assemblies with a less expensive hydraulic control unit are already known from the prior art, for example as described in EP 0 425 156 and EP 0 656 274.

In EP 0 656 274 the present applicant proposes a hydraulic control unit with a reversible pump, in the case of which the suction/delivery ports of the pump are each connected individually to an entry port of a corresponding AND valve, and both suction/delivery ports are connected to a common OR valve. By means of an electrically operable valve, the exit of said OR valve can be selectively connected to the other entry port of the two AND valves. The exit port of the one AND valve is also connected to the first connection of the first pair of hydraulic actuators connected in parallel, and the exit port of the second AND valve is connected to the second connection of said first pair of hydraulic actuators. Although the measures proposed in EP 0 656 274 lead to a reduction in the number of electrically operable control valves, when several actuators are being driven it is found that these measures lead to an even more complex circuit with a considerable number of valves. For example, this emerges from the example described in EP 0 656 274 with reference to FIG. 5, which describes a control unit for driving a standard folding roof assembly with a main bow, a rear bow and a cover, which have to be moved in a likewise standard sequence of movements by corresponding hydraulic cylinders.

SUMMARY OF THE INVENTION

The object of the present invention is to propose measures which permit a further cost reduction of hydraulic control units, especially for folding roof assemblies, in particular by means of a reduction in the number of electrically operated hydraulic valves. In particular, the object of the present invention is to provide a hydraulic control unit for a generally known type of folding roof, in which the collapsible frame thereof has a main bow and a rear bow, and in which the opened folding roof is accommodated in a compartment which can be covered by a movable cover.

According to a first aspect, the present invention provides a hydraulic control unit wherein the control unit further comprises a hydraulic AND valve which is provided with a first and a second entry port and with an exit port, the entry ports of the AND valve being connected respectively to the first and the second exit port of the control valve assembly, and the exit port of the AND valve forming a third exit port for controlling one or more following actuators of the hydraulic control unit. The pump need not be of the reversible type in this case.

The present invention is based on the realization that the exit port of the AND valve delivers a stream of hydraulic fluid if the control valve assembly connects the two connections of the first hydraulic actuator to the delivery port of the pump, which can happen in the case of "differential" extension of the piston rod or in the case of the piston rod being kept extended in that way. This method of driving the actuator concerned can even be carried out for a short period, so that a piston rod of the actuator which is, for example, kept extended by unilateral pressure is kept extended differentially for a short period. By using the hydraulic AND valve, which is known per se, in this way, it is possible to save on a considerably more expensive electrically operable control valve in many situations, while the total number of valves, and thus the cost thereof, also remains limited. It is pointed out that the arrangement of the AND valve described here ensures that in total considerably fewer valves are needed than is the case in the arrangement proposed in EP 0 656 274. By this measure it is found possible to drive the abovementioned standard folding roof assembly, with hydraulic actuators for the main bow, the rear bow and possibly also for the cover, by means of a hydraulic control unit which is considerably simpler and consequently cheaper in its composition than the known hydraulic control units by means of which such a folding roof assembly can be operated. According to a second aspect thereof, the invention therefore provides a folding roof assembly comprising a hydraulic control unit of the type described before. The present invention also relates to a vehicle provided with a folding roof and a hydraulic control unit for it according to the present invention.

In an advantageous embodiment the control valve assembly comprises a first and a second operable two-position control valve, each control valve having an exit port which is connected to the corresponding connection of the first actuator, and also an entry port which is connected to the delivery port of the pump, and a reservoir port which is connected to the reservoir, each valve in the first position thereof connecting the corresponding exit port to the reservoir and in the second position connecting it to the delivery port of the pump. The control valves are, for example, electrically operated 3/2 ball valves with spring return mechanism.

BRIEF DESCRIPTION OF THE DRAWINGS

The idea of the invention and advantageous embodiments thereof will be explained in greater detail below with reference to the drawing, in which:

FIGS. 3a–3f diagrammatically show six successive steps of the opening of the folding roof in FIG. 1;

FIGS. 4a–4f diagrammatically show six successive steps of the closing of the folding roof in FIG. 1;

DETAILED DESCRIPTION OF THE DRAWINGS

Figure 1:
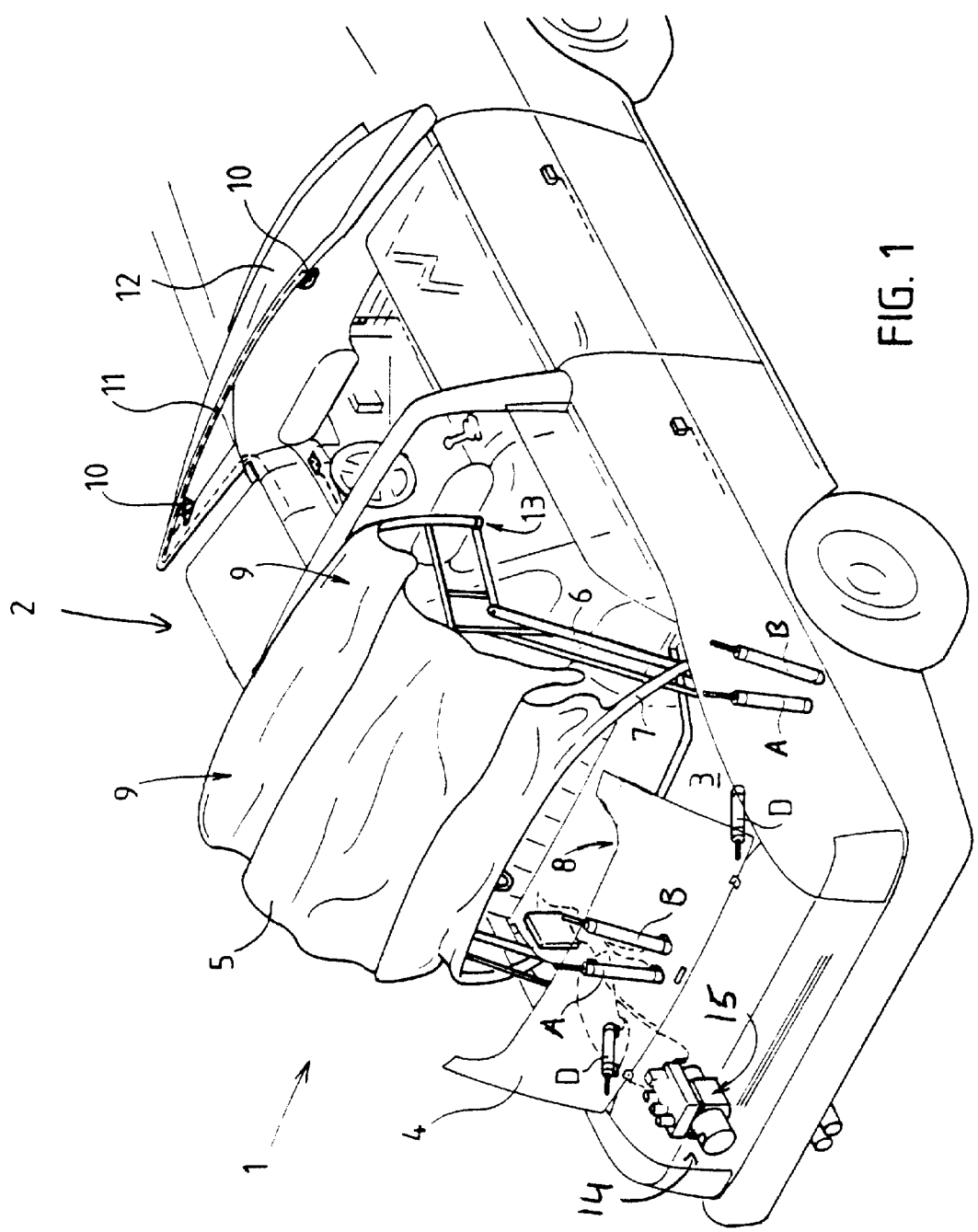
FIG. 1 shows a view in perspective of a vehicle of the convertible type, in which the folding roof is partially opened, and in which the hydraulic actuators of a preferred embodiment of the control unit according to the invention are indicated diagrammatically.

FIG. 1 shows a vehicle 1 of the convertible type, with a body and passenger part 2 therein. The vehicle 1 has a folding roof assembly composed of a folding roof for covering the passenger part 2 and a hydraulic control unit for moving the folding roof between a closed position, in which the folding roof covers the passenger part 2 of the vehicle 1, and an open position, in which the passenger part 2 is not covered.

Behind the passenger part 2 the body of the vehicle 1 has a compartment 3 for accommodating the folding roof therein when it is open, and also a cover 4 which can be swung up and down for shutting off the compartment 3.

The folding roof-has a folding covering 5 and a collapsible framework for the covering 5. The framework comprises, inter alia, a main bow 6, which is movable by the control unit between a swung-up and a swung-down position, and a swivelling rear bow 7 for moving a rear part of the covering 5 of the folding roof. The rear bow 7 is movable by the control unit between a swung-up position, in which the rear bow 7 lies more or less next to the swung-up main bow 6, as shown in FIG. 1, and a swung-down position.

A cover lock (not shown) is provided at 8, for locking the cover 4 in the position shutting off the compartment 3. In order to lock the folding roof in the closed position, two folding roof locks are provided at the front edge of the folding roof at 9, which locks can interact with lock recesses 10 in bar 11 above windscreen 12 of the vehicle 1. The locks can be, for example, manually or electrically operated locks which are known per se.

The folding roof shown is of a known type, in which the part of the folding roof adjoining the front edge of the folding roof can swing about a hinge line 13 in an upward direction relative to the part of the folding roof situated behind it. This swinging of the front part of the folding roof is effected by a mechanical coupling between said front part and the rear part of the folding roof moved by the rear bow 7. This emerges clearly from the description which follows with reference to FIGS. 3 and 4.

The hydraulic control unit comprises several hydraulic actuators, namely a pair of main bow actuators A for swinging the main bow 6, a pair of rear bow actuators B for swinging the rear bow 7, and a pair of cover actuators D for cover 4.

The main bow actuators A, the rear bow actuators B and the cover actuators D are linear piston/cylinder units of the double-acting type, each with a first variable working chamber and a second variable working chamber, which working chambers are separated from each other by a piston of the corresponding actuator, indicated respectively by a1, a2, b1, b2 and d1, d2. The actuators of each pair are connected in parallel in a known manner, so that for the sake of simplicity only one actuator of each pair is indicated in each case in the remainder of the description.

The hydraulic control unit further comprises a reservoir 14 for hydraulic fluid, and a pump 15.

Figure 2:
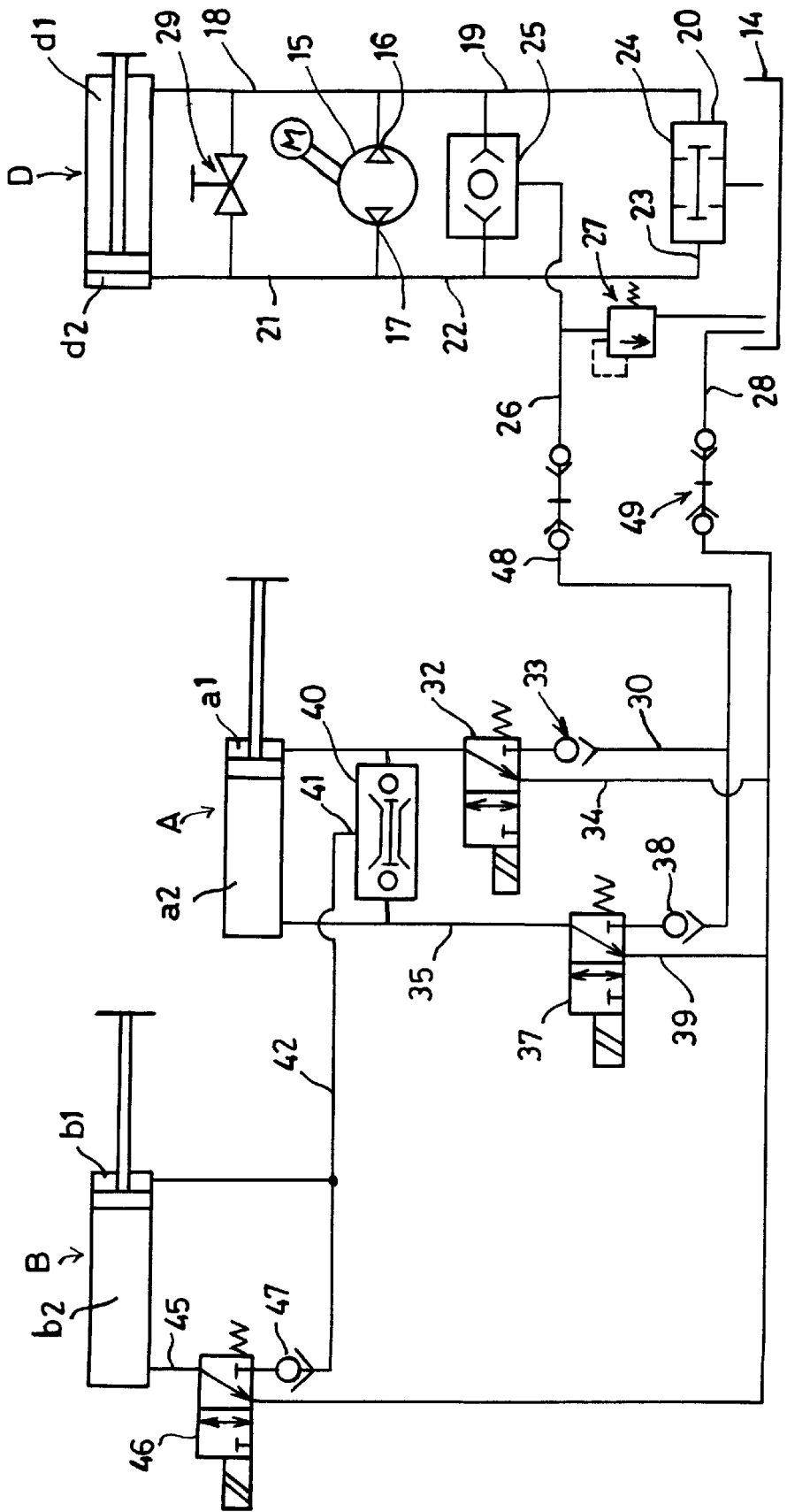
FIG. 2 shows the hydraulic diagram of the preferred embodiment of the hydraulic control unit according to the invention.

For a detailed description of the preferred embodiment of the hydraulic control unit of the vehicle 1 shown in FIG. 1 reference is now made to FIG. 2.

It can be seen in FIG. 2 that the pump 15 is a reversible hydraulic pump driven by electric motor M with two directions of rotation, for example a radial plunger pump, with a first pump port 16 and a second pump port 17. The pump ports 16 and 17 are therefore dependent upon the direction of rotation of electric motor M, suction port for drawing in hydraulic fluid from the reservoir 14 or delivery port for delivering hydraulic fluid under pressure to the actuators A, B and D.

The first pump port 16 is connected by way of a first line 18 to the first working chamber d1 of the cover actuator D, which first working chamber d1 effects the closing of the cover 4 when hydraulic fluid is fed to said chamber. The first pump port 16 is connected by way of a second line 19 to port 20 of a suction shuttle valve 24, which in turn is in communication with the reservoir 14.

The second pump port 17 is connected by way of a third line 21 to second working chamber d2 of the cover actuator D, and by way of a fourth line 22 to port 23 of the suction shuttle valve 24, which is connected to the reservoir 14.

An OR valve 25 is connected by its entry ports respectively to the second line 19 and the fourth line 22, and a pressure line 26 connects to its exit port. The pressure line 26 accommodates a pressure limiting valve 27, which opens into the reservoir 14 when there is excess pressure in the pressure line 26.

A return line 28 also opens out into the reservoir 14. In addition, an operable emergency valve 29 can be seen, which valve can be opened in the event of a fault, in order to permit manual operation of the cover.

The OR valve 25 ensures that there is always a connection between the port of the pump 15 acting as a delivery port and the pressure line 26, and in this case shuts off the connection between pressure line 26 and the suction port of the pump 15.

A fifth line 30 connects to the pressure line 26, which fifth line leads to first working chamber a1 of the main bow actuator A, which when hydraulic fluid is supplied to it moves the main bow 6 (FIG. 1) to a position in which the folding roof is open.

From the first working chamber a1 of the actuator A to the pressure line 26 an operable control valve 32 and a non-return valve 33 which shuts off in the direction of pressure line 26 are accommodated one after the other in the fifth line 30. The valve 32 is an electromagnetically operated 3/2 control valve with spring return mechanism, preferably of the ball valve type, which in the unoperated state connects the first working chamber a1 to the reservoir 14, and in the operated state connects the pressure line 26 to the first working chamber a1. The non-return valve 33 can be integral with the valve 32. A sixth line 34 connects the valve 32 to the return line 28.

A seventh line 35 connects the second working chamber a2 of the actuator A to the pressure line 26, which second working chamber a2 effects the upward swing of the main bow 6 (see FIG. 1) when hydraulic fluid is supplied to said chamber. From the second working chamber a2 of the actuator A to the pressure line 26 an operable control valve 37 and a non-return valve 38 which shuts off in the direction of pressure line 26 are accommodated one after the other in the seventh line 35. The valve 37 is an electromagnetically operated 3/2 control valve with spring return mechanism, which in the unoperated state connects the second working chamber a2 to the reservoir 14, and in the operated state connects the pressure line 26 to the second working chamber a2. An eighth line 39 connects the control valve 37 to the return line 28.

A hydraulic AND valve 40 can also be seen in the diagram. Said AND valve 40 has two entry ports and a single exit port, one entry port being in communication with the exit port of the control valve 32, and the other entry port being in communication with the exit port of control valve 37. The AND valve 40 is designed in such a way that hydraulic fluid is delivered at the exit port 41 thereof only when both valves 32, 37 are operated, i.e. when both entry ports of the AND valve 40 are in communication with the pressure line 26. As is known per se and shown diagrammatically in the diagram, the AND valve 40 can comprise, for example, an element with a main bore, having at each end thereof a seat for a ball and between the two seats a transverse bore to the exit port 41 of the valve 40. The main bore here contains a rod-shaped spacer between the two balls, which spacer is of such a length that the two balls can never go onto their seat at the same time. Furthermore, there is play between the spacer and the main bore, so that hydraulic fluid can run along the spacer into the transverse bore. Such an AND valve 40 is simple to manufacture.

A ninth line 42 connects to the exit port 41 of the AND valve 40, which ninth line connects directly to first working chamber b1 of rear bow actuator B, which first working chamber b1 effects the upward swing of the rear bow 7 when hydraulic fluid is supplied to said chamber. The second working chamber b2 of the actuator B connects by way of a tenth line 45 to the ninth line 42. From the second working chamber b2 of the actuator B to the ninth line 42 an operable valve 46 and a non-return valve 47 which shuts off in the direction of ninth line 42 are accommodated one after the other in the tenth line 45. The valve 46 is an electromagnetically operated 3/2 valve with spring return mechanism, preferably of the ball valve type, which in the unoperated state connects said second working chamber b2 to the return line 28 leading to the reservoir 14, and in the operated state connects it to the ninth line 42. The non-return valve 47 can be integral with the valve 45.

The pressure line 26 and the return line 28 accommodate detachable quick-acting couplings 48, 49, preferably of the known type with coupling parts provided with internal shut-off valves, which shut-off valves directly shut off the two coupling parts when the couplings are detached. These quick-acting couplings 48, 49 mean that the hydraulic control unit can be manufactured in two separate parts, which are filled beforehand with hydraulic fluid and are not connected to each other until they are being mounted on the vehicle.

It will be clear that, if desired, the diagram can be extended with additional hydraulic actuators, for example for operating the locks for the folding roof or the cover. It will also be clear that the idea of the invention is achieved if the cover 4 is operated by means other than by the hydraulic cover actuators D described, for example by an electromechanical drive unit. In that case the cover actuator D can be omitted from the diagram of FIG. 2, and a pump operating in one direction would also suffice, instead of the reversible pump 15 shown here.

For the movement sequence for opening of the folding roof of the vehicle according to FIGS. 1 and 2, Reference is now made to FIGS. 3a–3f, in which the position of the actuators A, B, D from the diagram of FIG. 2 is indicated in the case of each of the FIGS. 3a–3f.

FIG. 3a shows the closed position of the folding roof. The position of the actuators A, B, D here corresponds to the position of the actuators A, B, D shown in FIG. 2.

For opening of the folding roof, the locks of the folding roof are first unlocked, after which the pump 15 is driven in a first step in such a way that the first pump port 16 acts as a delivery port. The cover actuators D consequently remain retracted. In the first step the valves 32 and 37 are also operated, with the result that the main bow actuators A are kept extended differentially. By now leaving valve 46 unoperated, hydraulic fluid is supplied by way of the AND valve 40 to the first working chamber b1 of the rear bow actuator B, with the result that the piston rod thereof is retracted and the rear part of the folding roof swings upwards to a position in which the cover 4 can be swung up. By means of the earlier mentioned mechanical coupling, the front part of the folding roof also swings up from the windscreen about line 13. This position is shown in FIG. 3b.

In a second step, the direction of rotation of the pump 15 is reversed and the second pump port 17 becomes the delivery port. The valves 32 and 37 remain operated and the valve 46 remains unoperated. As a result of this, the rear bow 7 remains swung up and the cover actuators D swing open the cover 4. The position now reached is shown in FIG. 3c.

In a third step, the second pump port 17 remains the delivery port of the pump 15 and the valves 32 and 37 remain operated, while the valve 46 is now also operated. As a result, the rear bow actuators B are differentially extended and the rear bow 7 swings partially downwards again, and the front part of the folding roof is also swung partially down again without thereby locking with the bar 11. The position now reached is shown in FIG. 3d.

In a fourth step, the second pump port 17 remains the delivery port of the pump 15 and the valve 32 remains operated, while the valve 37 is now no longer operated. The valve 46 is no longer operated either. Through this switching of the valves 32 and 37, the main bow actuators A are retracted, which causes the main bow 6 of the folding roof to swing down, so that the entire folding roof comes to rest in the opened compartment 3. In this case the AND valve 40 is shut off at the entry side connected to the valve 32. The rear bow actuators B are forced to their retracted position by the swing of the main bow 6, i.e. by an external force, which is possible because of the fact that the valve 46 connects the second working chamber b2 to the return line 28. The chamber b1 in this case is also connected to the return line 28, so that hydraulic fluid can be drawn in. The position now reached is shown in FIG. 3e.

In a fifth step, the direction of rotation of the pump 15 is reversed and the first pump port 16 becomes the delivery port of the pump 15. This causes the cover 4 to close. For the rest, the valve 32 possibly remains operated, and the valves 37 and 46 remain unoperated. The cover 4 is then locked in its closed position. The folding roof is now fully open, a position which is shown in FIG. 3f.

The closure of the folding roof according to FIGS. 1 and 2 will now be explained with reference to FIGS. 4a–4f, the position of the actuators A, B, D from the diagram of FIG. 2 being indicated in each case in each of FIGS. 4a–4f.

FIG. 4a shows the folding roof in the fully opened position, which position is identical to FIG. 3f. The lock (not shown) of the cover 4 is then unlocked.

In a second step, the pump 15 is put into operation, the second pump port 17 being the delivery port. This causes the cover actuator D to open the cover 4 of the vehicle 1. This position is shown in FIG. 4b. For the rest, the valves 32, 37 and 46 are not operated.

In a third step, the second pump port 17 remains the delivery port. For the rest, the valve 37 is now operated, so that the main bow actuators A extend and the main bow 6 swings up. The valve 46 is not operated now, with the result that the two ports of the rear bow actuator B are connected to the reservoir 14. This causes the rear bow actuators B to extend, since they are loaded with the weight of the rear part of the folding roof. The position now reached is shown in FIG. 4c.

In a fourth step, the second pump port 17 remains the delivery port, and the valves 32 and 37 are operated. The valve 46 remains unoperated, so that the rear bow actuators B are retracted, with the result that the rear bow 7 swings up and comes to rest approximately next to the swung-up main bow 6. The movement upwards of the rear bow 7 causes the front part of the folding roof, which is not yet locked, also to swing up about line 13. This position is shown in FIG. 4*d*.

In a fifth step, the direction of rotation of the pump 15 is reversed and the first pump port 16 becomes the delivery port. This causes the cover 4 to close. The position now reached is shown in FIG. 4*e*.

In a sixth step, the first pump port 16 remains the delivery port. For the rest, the valves 32 and 37 remain operated, and the valve 46 is now also operated. The main bow 6 consequently remains swung up, and the rear bow 7 is now swung down through the differential extension of the rear bow actuators B. The rear bow 7 in this case comes to rest on top of the closed cover 4. The front part of the folding roof also comes to rest against the bar 11 above the windscreen 12. Finally, the folding roof is locked on the bar and possibly on the rear side. The folding roof is now fully closed, which is shown in FIG. 4*f*.

Figure 5:
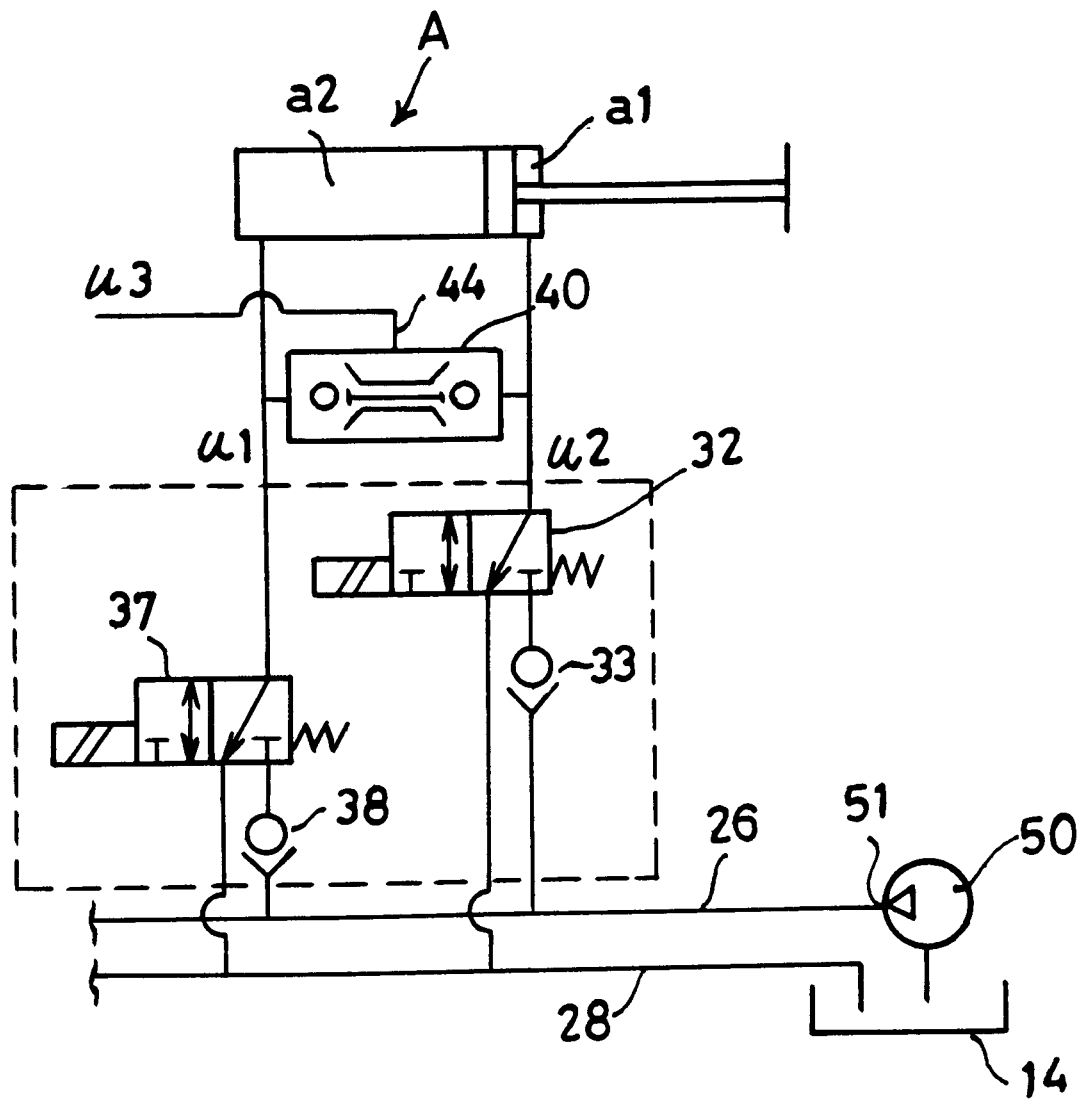
FIG. 5 shows a hydraulic diagram of an exemplary embodiment of the hydraulic control unit according to the invention.

FIG. 5 shows a simple embodiment of the hydraulic control unit according to the invention, which in fact corresponds to a part of the diagram shown in FIG. 2. Therefore, for the sake of simplicity the same parts are indicated by the same reference numerals. Instead of the reversible pump 15, here a pump 50 is provided having a single delivery port 51, which connects to the pressure line 26. In addition, dashed lines show the boundary of the control valve assembly of the actuator A with two exits u1 and u2, and also the AND valve 40 connected to said exits u1 and u2, which valve in turn forms a third exit u3. As already mentioned, the AND valve 40 makes it possible to provide a stream of hydraulic fluid at its exit 41 when the two entry ports of said valve 40 are connected to the pump 50, which connection can possibly be achieved for a short period by operating the two valves 32 and 37 temporarily. If the actuator A had then already been extended, such operation produces no movement of the actuator A, but the piston rod of the actuator A is then kept extended differentially.

What is claimed is:

1. A hydraulic control unit, comprising a reservoir for hydraulic fluid, a pump for drawing hydraulic fluid out of the reservoir and provided with a delivery port for delivering pressurized hydraulic fluid, and also at least one first hydraulic actuator of the double-acting type having a movable piston separating a first and a second variable working chamber, said actuator being provided with a first and a second connection respectively for supplying hydraulic fluid to said working chambers, said hydraulic control unit further comprising a control valve assembly with a first exit port and a second exit port, which are connected respectively to the first and the second connection of the first actuator, for controlling the first actuator, which control valve assembly comprises one or more operable control valves for selectively connecting one of the two or both exit ports thereof to the delivery port of the pump or the reservoir, wherein, a hydraulic AND valve is provided, having a first and a second entry port and an exit port, the entry ports of the AND valve being connected respectively to the first and the second exit port of the control valve assembly, and the exit port of the AND valve forming a third exit port for controlling one or more following actuators of the hydraulic control unit.

2. A hydraulic control unit according to claim 1, in which the control valve assembly comprises a first and a second operable two-position control valve, each control valve having an exit port which is connected to the corresponding connection of the first actuator, and also an entry port which is connected to the delivery port of the pump, and a reservoir port which is connected to the reservoir, each control valve in the first position thereof connecting the corresponding exit port to the reservoir of the pump and in the second position thereof to the delivery port.

3. A hydraulic control unit according to claim 1, in which a second hydraulic actuator is provided with a piston and at least one variable first working chamber bounded by the piston, and also a corresponding first connection for supplying hydraulic fluid to said first working chamber, the third exit port provided by the AND valve being connected to the first working chamber of the second actuator.

4. A hydraulic control unit according to claim 1, in which a second double-acting hydraulic actuator is provided having a movable piston separating a first variable working chamber and a second variable working chamber, said second actuator having a first and a second connection for supplying hydraulic fluid to said first and second working chamber respectively, the third exit port provided by the AND valve being connected to the first working chamber of the second actuator, said hydraulic control unit further comprising a third two-position control valve having an exit port which is connected to the second connection of the second actuator.

5. A hydraulic control unit according to claim 1, in which a second double-acting hydraulic actuator is provided having a movable piston separating a first variable working chamber and a second variable working chamber, said second actuator having a first and a second connection for supplying hydraulic fluid to said first and second working chamber respectively, the third exit port provided by the AND valve being connected to the first working chamber of the second actuator, said hydraulic control unit further comprising a third two-position control valve having an entry port which is connected to the exit port of the AND valve, a reservoir port which is connected to the reservoir and an exit port which is connected to the second connection of the second actuator, the third two-position control valve having a first position wherein the exit port thereof is connected to the reservoir and a second position wherein the exit port thereof is connected to the exit port of the AND valve.

6. A hydraulic control unit according to claim 1, in which a second double-acting hydraulic actuator is provided having a movable piston separating a first variable working chamber and a second variable working chamber, said second actuator having a first and a second connection for supplying hydraulic fluid to said first and second working chamber respectively, the third exit port provided by the AND valve being connected to the first working chamber of the second actuator, said hydraulic control unit further comprising a third two-position control valve having an exit port which is connected to the second connection of the second actuator,in which a common pressure line is provided for creating a connection between the delivery port of the pump and each control valve provided with a corresponding entry port, and in which a common return line is provided creating a connection between the reservoir and each control valve provided with a corresponding entry port.

7. A hydraulic control unit according to claim 1, in which the pump is a reversible pump with a first and a second suction/delivery port, each connecting by way of a corresponding line to a suction shuttle valve which is in communication with the reservoir, an OR valve being provided and having a first and a second entry port, which entry ports are in communication respectively with the first and second suction/delivery port of the pump, and having an exit port connected to the control valve assembly.

8. A hydraulic control unit according to claim 1, in which the pump is a reversible pump with a first and a second suction/delivery port, each connecting by way of a corresponding line to a suction shuttle valve which is in communication with the reservoir, an OR valve being provided and having a first and a second entry port, which entry ports are in communication respectively with the first and second suction/delivery port of the pump, and having an exit port connected to the control valve assembly, and in which a third hydraulic actuator of the double-acting type is provided, having a first and second variable working chamber separated from each other by a piston, and having a first and second connection which are connected to the first and second working chamber respectively, the first connection of the third actuator being connected to the first suction/delivery port of the pump, and the second connection being connected to the second suction/delivery port of the pump.

9. Vehicle of the convertible type provided with a folding roof and a hydraulic control unit for moving the folding roof according to claim 1.

10. A folding roof assembly for a vehicle, in which the folding roof assembly comprises a folding roof which is movable between a closed position, in which the folding roof covers a passenger space of the vehicle, and an open position, in which said passenger space is not covered, and in which the folding roof assembly further comprises a hydraulic control unit for moving the folding roof, which folding roof comprises a folding covering and a collapsible framework for the covering, which framework comprises a main bow which is movable by the control unit between a swung-up and swung-down position, and a rear bow for moving a rear part of the folding roof, which rear bow is movable by the control unit between a swung-up and swung-down position, the control unit having a reservoir for hydraulic fluid and a pump connected to the reservoir and provided with a delivery port for delivering compressed hydraulic fluid, and also a hydraulic main bow actuator for swinging the main bow up and down, and a hydraulic rear bow actuator for swinging the rear bow up and down, the main bow actuator and rear bow actuator both being of the double-acting type, each with a first and a second variable working chamber, said working chambers being separated by a piston of the corresponding hydraulic actuator, the control unit further comprising a control valve assembly with a first exit port and a second exit port, which are respectively connected to the first and the second connection of the main bow actuator for controlling the movements of the main bow actuator, which control valve assembly comprises one or more operable control valves and is designed for selective connection of one of the two or both exit ports thereof to the delivery port of the pump or the reservoir, wherein a hydraulic AND valve is provided, having a first and a second entry port and an exit port, the entry ports of the AND valve being connected respectively to the first and the second exit port of the control valve assembly of the main bow actuator, and the exit port of the AND valve being connected to the first connection of the rear bow actuator, an operable control valve belonging to the second connection of the rear bow actuator is provided.

\* \* \* \* \*